Patented Sept. 3, 1946

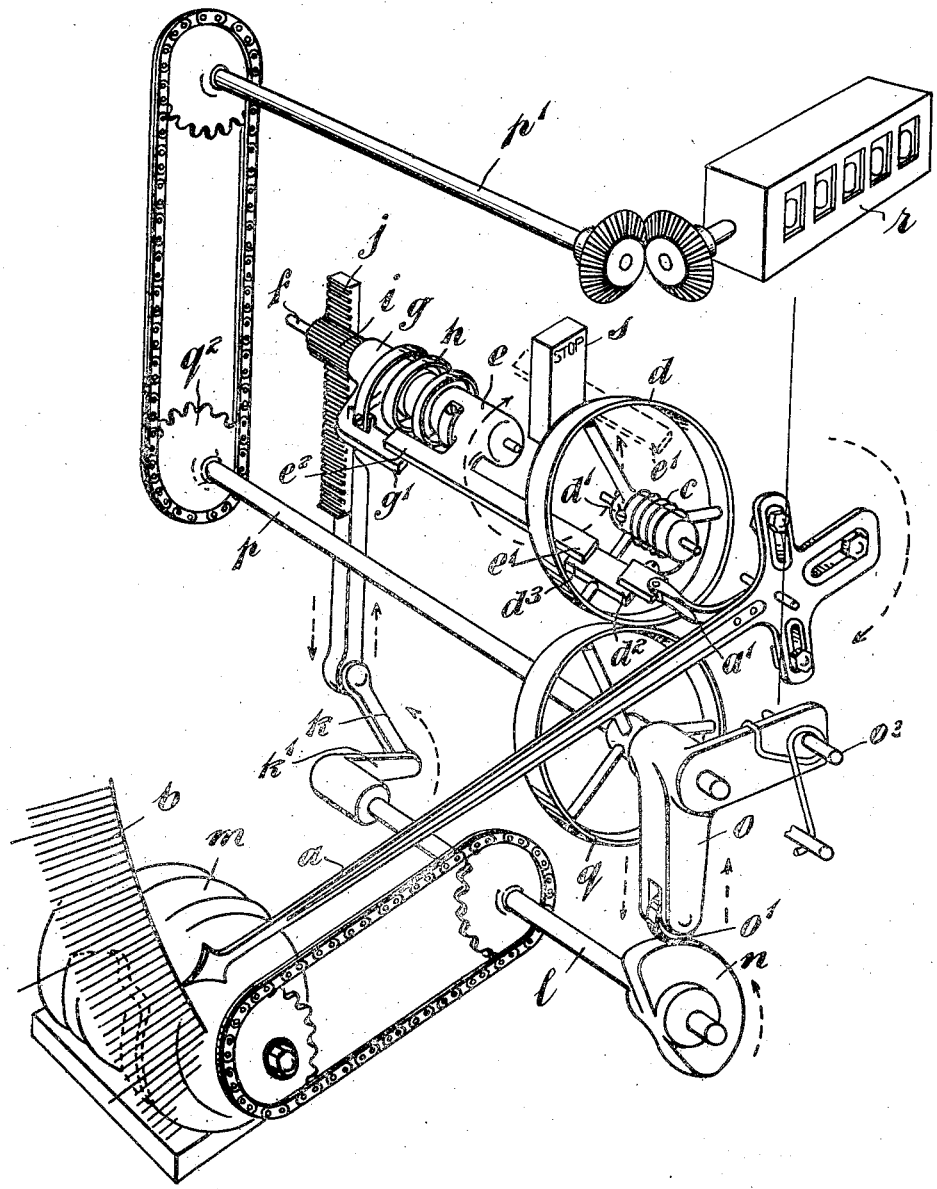

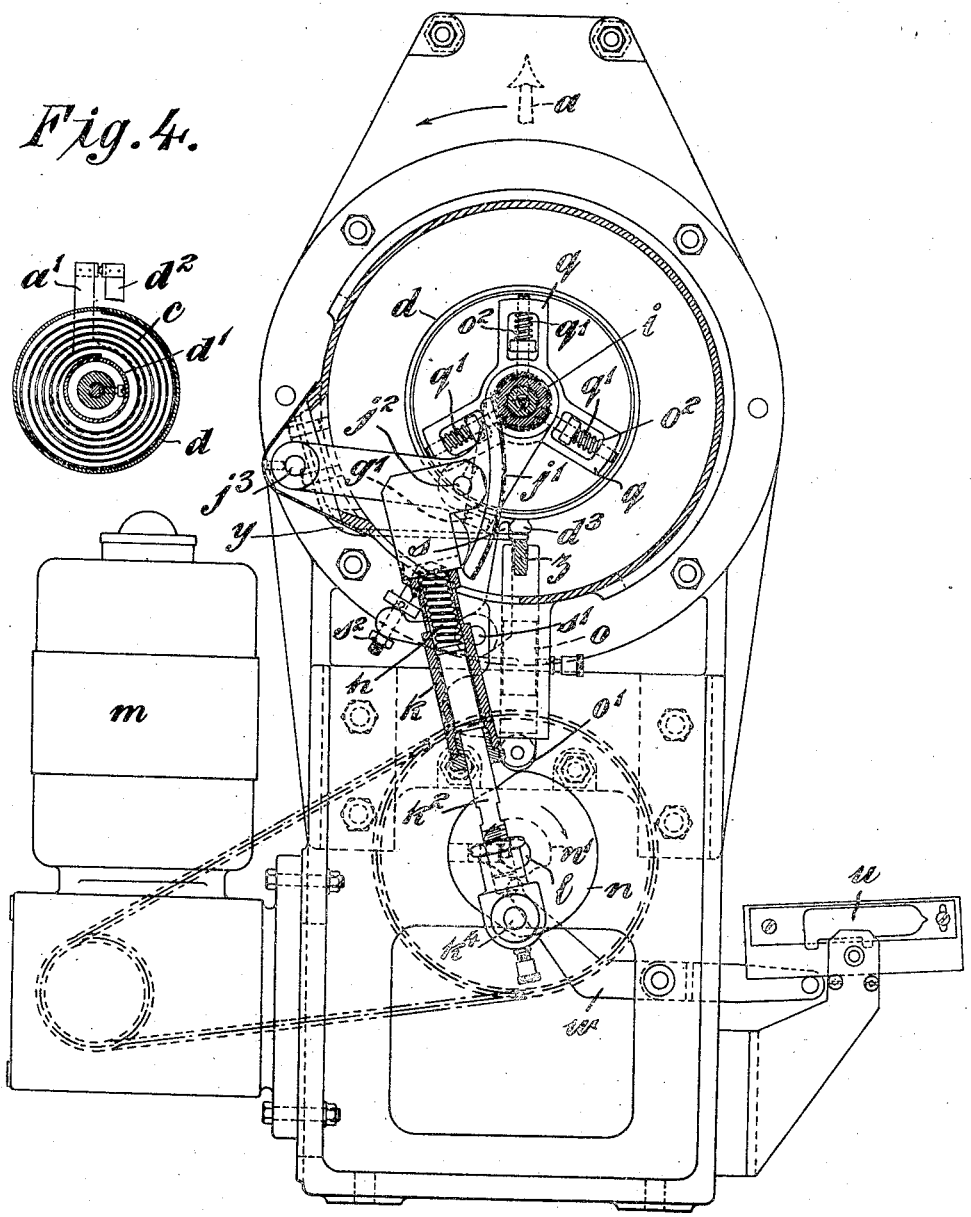

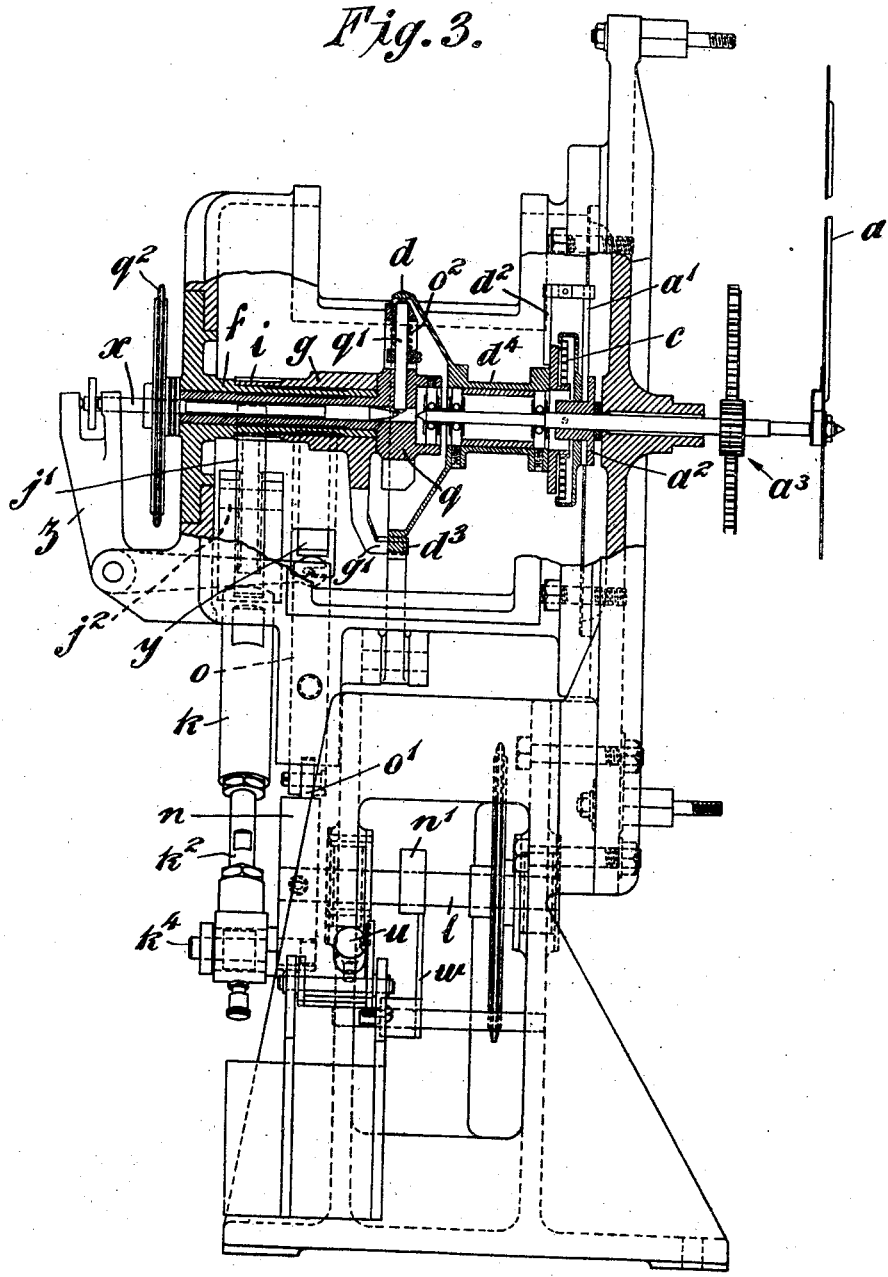

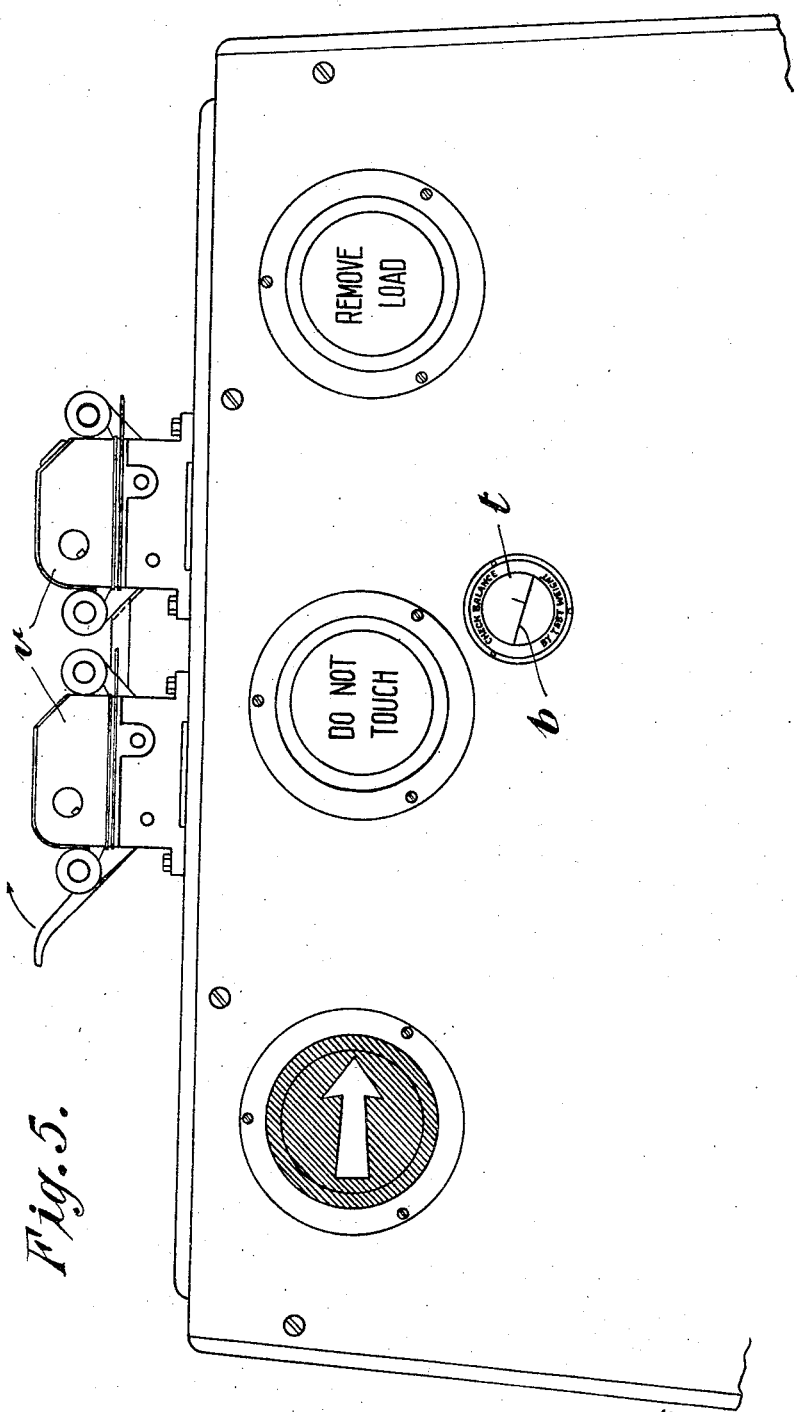

2,406,897

UNITED STATES PATENT OFFICE 2,406,897

AUTOMATIC WEIGHING APPARATUS EMBODYING A TOTALIZING MECHANISM

Alfred Ernest Page, Birmingham, England, assignor to W. & T. Avery Limited, Birmingham, England Application October 8, 1943, Serial No. 505,438
In Great Britain October 29, 1942

6 Claims. (Cl. 235—91)

This invention has reference to improvements in automatic weighing apparatus embodying a totalizing mechanism, and has for its object to provide a relatively simple mechanism which will afford a means of coupling and uncoupling the weighing mechanism and the totalizing mechanism at the requisite periods, the mechanism being of a robust character and incorporating only the minimum number of parts so that the risks of breakdown or of any defect arising in the mechanism are reduced to a minimum. A further objective of the present invention is the incorporation in the apparatus of a plurality of visible signals which indicate stages in the loading, weighing, and unloading operations of the apparatus.

The invention consists of an automatic weighing apparatus incorporating a totalizing mechanism wherein means are provided for effecting a mechanical coupling between a rotatable weighing member and a measuring unit, said measuring unit being connected to a mechanically operated means for transmitting the motion of the weighing member to a totalizing counter, the measuring unit incorporating a spring coupling which admits of a degree of relatively free motion of part of the unit during the period when the uncoupling of the weighing apparatus and the measuring unit takes place.

The invention further consists in the provision of a wound spiral spring coupling between the weight indicator and a weighing wheel or clutch member to admit of the wheel or member being rotated in a reverse direction without involving a similar or return motion of the weight indicator when the indicator is maintained or held in an indicative position by a load on the weighing apparatus.

The invention further consists in the embodiment in the apparatus of a plurality of visible signals, say light signals interconnected with switch control circuits in the mechanism, one or more of said switches being positively operated in synchrony with the rotation of an electric motor which is the power unit for controlling the cycle of the mechanism of the apparatus, said signals indicating time stages in the sequence of operations indicating when the load may be applied, weighed and removed, so as to ensure the proper timed sequence of the various operations.

The invention is further comprised in certain operative parts of the mechanism to effect the aforesaid coupling and uncoupling at the periods when the weighing member is stationary as will be more particularly hereinafter described.

The invention will now be described with reference to the accompanying drawings, in which:

Fig. 1 is a diagrammatic perspective lay-out showing the essential features of the mechanism comprising the present invention, the parts being shown in the position they would occupy when a load is being weighed and measured.

Fig. 2 is a rear face elevation of one practical embodiment of the mechanism illustrating the parts in the position they would occupy when there is no load on the weighing platform, that is, the mechanism is free to effect a weighment.

Fig. 3 is a part sectional side elevation of the mechanism seen in Fig. 2 looking on the right hand side of that figure, the section being taken on the spindle or axis of the weight indicator.

Fig. 4 is a detailed view showing the wound spiral spring coupling which obtains between the weighing and measuring units in the neutral position.

Fig. 5 is a front elevation of a signal device capable of illumination and adapted to be associated with the apparatus, which device also incorporates the weight totalizer or counter and a weight printing device.

Considering first the illustration of the invention as shown in Fig. 1 of the drawings which may be said to illustrate its application to a platform weighing machine incorporating an automatic resistant to the load such as a pendulum or calibrated springs, the load is communicated through the aforesaid resistance to a weight indicating pointer $a$ which moves over and in relation to a graduated chart $b$ which forms part of a circular dial with which the pointer registers. The pointer $a$ is provided with an integral arm $a^1$ which is connected to one end of a light wound spring $c$, the other end of which is connected to the hub $d^1$ of a wheel $d$ hereinafter termed the weighing wheel. The wheel $d$ is adapted to move in synchrony with the pointer $a$ through the aforesaid connection. Mounted on a spoke of the weighing wheel $d$ are projections $d^2$ and $d^3$ extending from opposite faces of the wheel. The projection $d^2$ is adapted to contact with the free or extending end of the arm $a^1$ while the projection $d^3$ is adapted to be contacted by an arm hereinafter termed the long arm $e^1$ which extends from a cylindrical collar $e$ freely rotatably mounted on a spindle $f$. The collar $e$ is also provided with a short arm extension $e^2$ which is adapted to contact with another arm $g^1$ extending from an aligned cylindrical collar $g$ mounted on the spindle $f$, the inner end face of the collar $g$ abutting the inner end face of the collar $e$. These two collars $e$ and $g$ are connected together by means of a relatively strong wound spring $h$ which effects a definite coupling between the two collars. Rigidly connected to the collar $g$ is a pinion $i$ which meshes with a rack $j$ which in turn is pivotally connected through a connecting rod $k$ to a crank $k^1$ by means of which reciprocating motion is imparted to the rack $j$ from a driving shaft $l$ on which the crank is mounted, the shaft $l$ being connected through sprocket wheel and chain transmission to a motor $m$ or other source of power. On the shaft $l$ is mounted a cam $n$, on the periphery of which bears an anti-friction roller $o^1$ which is freely mounted in the lower end of a spring-loaded member $o$, shown in Fig. 1 as a cranked arm pivoted on a pin $o^3$. Mounted in the upper part of the member $o$ is one end of a shaft $p$ on which is mounted a wheel $q$ hereinafter termed the measuring wheel adapted at times to be brought into contact or mesh with the periphery of the weighing wheel $d$ resiliently connected to the index pointer $a$. The shaft $p$ is connected by a sprocket wheel $q^2$ and chain transmission with the shaft $p^1$ provided with a bevel pinion coupling for the operation of a totalizing counter $r$. A stop $s$ is provided to determine the one limit of the position of the longer arm $e^1$ extending from the collar $e$ which stop is employed as a definite locating member as will hereinafter appear in connection with the description of the operation of the mechanism.

When the load is placed on the platform of the machine the pointer $a$ moves round to the load position in a clockwise direction as indicated by the dotted arrow on the right-hand side of Fig. 1; at the same time as this movement of the pointer takes place the arm $a^1$ moves through the same arc as the pointer and in so doing through the light spiral spring $c$ rotates the weighing wheel $d$ which is adapted to move in synchrony with the pointer $a$, the degree of rotation of this weighing wheel $d$ being the same as that imparted to the pointer $a$. This follower motion of the weighing wheel $d$ through the light spiral spring $c$ is determined or limited by the projection $d^2$ coming into or being maintained in contact with the arm $a^1$ extending from the index pointer $a$ or following in contact therewith. This position which may be termed the load position of the weight indicating parts is the position from which measurement is to be effected, which measurement is to be communicated through gearing to the totalizing counter $r$ to afford an indication or record of the weighment in numerals or digits. During this weighing operation the measuring wheel $q$ is declutched or freed of the weighing wheel $d$ so that during the weighing operation the load has only to rotate the index pointer $a$ and through the light spiral spring $c$ the weighing wheel $d$ associated therewith, whereby no connection obtains between the weighing mechanism and the measuring unit or totalizing counter.

When the weighing operation has been completed i. e. the index pointer $a$ has come to a position of rest a starter button in the circuit of the motor $m$ is pressed and the motor rotates the cam shaft $l$ through the sprocket wheel and chain transmission which rotation of the cam shaft $l$ effects a reciprocating motion of the rack $j$ through the crank $k^1$ and connecting rod $k$. The rack is first lifted and rotates the pinion $i$ meshing therewith, the pinion in turn rotating the collar $g$ which is connected thereto. This rotation is imparted through the relatively strong wound spring connection $h$ from the collar $g$ to the aligned collar $e$ on which is provided the pair of divergent arms $e^1$ $e^2$ of different lengths. This rotary motion is effected in an anti-clockwise direction from the neutral or starting point adjacent one face of the stop $s$. This rotary motion causes the short arm $e^2$ which is in contact with the arm $g^1$ to travel together with the arm $g^1$ as a coupled unit until the longer arm $e^1$ associated with the collar $e$ contacts with the projection $d^3$ from the one face of the weighing wheel $d$. From this point the measurement of the amount of the weighment takes place and is transmitted to the totalizing counter $r$ through the measuring wheel $q$ which has in the interim been brought into peripheral contact with the weighing wheel $d$ through the action of the cam $n$ and the spring loaded buffer rod $o$. Motion is transmitted through the sprocket wheel and chain gearing to the totalizing counter $r$ from the shafts $p$ and $p^1$. Now the two spring associated collars $e$ and $g$ and the projections $e^1$ $e^2$ and $g^1$ forming parts thereof and the weighing wheel $d$ move in an anti-clockwise direction as one connected unit until the longer arm $e^1$ strikes or approaches the rear face of the stop $s$ as indicated in dotted lines in this figure. From this point the continued anti-clockwise rotation can only obtain in respect of the collar $g$ which has not been checked or held by any abutment of the arm $g^1$ with the stop $s$ and thus the collar $g$ and pinion $i$ can now rotate further in an anti-clockwise direction (say through an angle of approximately 30°) which motion is permitted by the provision or interposition of the wound spring coupling $h$ obtaining between the collars $e$ and $g$ so as to provide what may be termed a degree of overdrive and a period of lag during which the cam-controlled mechanism can function to admit of the measuring wheel $q$ falling from contact with the weighing wheel $d$, that is, the wheels $d$ and $q$ become disconnected or declutched.

If the load is still on the platform of the weighing machine then the pointer $a$ and the integral arm $a^1$ associated therewith remain in or substantially in the load position, but if the load has been removed from the machine, then the pointer $a$ and the arm $a^1$ move back to the zero position due to the fact that there is no pull exerted on the weighing mechanism from the load, and therefore no resistance to such return motion.

A reversal of the direction of motion of the rack $j$ now obtains due to the stroke of the crank $k^1$ when the arms $e^1$ $e^2$ and $g^1$ respectively associated with the collars $e$ and $g$ which have re-contacted travel back in a clockwise direction to their starting position at which position the arm $e^1$ associated with the collar $e$ is located in adjacency to the front face of the stop $s$, the parts being now in a position to effect the next weighing and measuring sequence.

It will be appreciated from the foregoing description that the mechanism thus affords a degree of free motion at the coupling end, that is, prior to the commencement of the actual measuring operation, and that the spring coupling $h$ between the two collars $e$ and $g$ and the spring loading of the buffer rod $o$ permits of a degree of relatively free motion at the uncoupling end i. e. following the completion of the measuring or totalizing operation during which period uncoupling or declutching of the wheels $d$ and $q$ obtains.

The spring coupling between the index pointer $a$ and the weighing wheel or clutch member $d$ and the coiled spring resistance between the power driven unit and the measuring unit provide for a resilient coupling between the measuring unit and the weighing wheel or outer clutch member. Thus an over-run is provided for the measuring unit which will admit of the completion of the totalizing record and of the subsequent declutching motion required between the clutch members $q$ and $d$ without involving any strain upon or damage to this part of the mechanism which is essential to achieving an accurate record and transmission of the weighment.

It is essential to the accurate operation of the mechanism that the weighing wheel $d$ associated with the index pointer be stationary at both the coupling and uncoupling moments; hence there is provided the degree of excess motion of the measuring unit at both extremities of its arc. The recording or totalizing unit and the measuring unit are both operated from a common power source i. e. the motor $m$ and during each cycle there can be said to be two periods when the recording or totalizing unit is free of both the weighing and the measuring units, that is, during the period of the actual weighing operation and during the period immediately following the completion of the measuring or totalizing operation.

These periods of operation involving loading, weighing and unloading of the material to be passed over the apparatus whether for individual weighment, intermittent totalizing weighment, or continuous totalizing weighment, are advantageously indicated by means of three independent transparent or semi-transparent coloured discs, say of glass, each disc bearing an appropriate marking and each disc being in turn illuminated by a lamp associated therewith and in circuit with one of the series of switch controlled circuits which are connected to the electric motor $m$ which forms the power unit for the operational control and completion of the cycle of the mechanism of the apparatus. Such an indicating or signalling unit is illustrated by Fig. 5 of the drawings and this indicating or signalling unit is adapted for disposition at any convenient part on the front of the apparatus readily visible to the operator who can at the same time observe the position of the index pointer $a$ and if required the digits of the totalizing counter $r$.

Referring now more particularly to the practical embodiment of the invention illustrated in part by Figs. 2 to 5 of the drawings, this embodiment is modified in certain details of the mechanism from the diagrammatic illustration described in relation to Fig. 1 of the drawings; for example in place of the measuring wheel $q$ and the spring-loaded buffer rod $o$ there is substituted an internal expanding clutch, the outer section of the clutch corresponding to the weighing wheel $d$. Moreover the collar $e$ and parts connected thereto are dispensed with and the arm $g^1$ is directly associated with the arm or projection $d^3$ extending from the clutch wheel or section $d$. In substitution for the vertically reciprocating rack $j$ there is embodied in this mechanism a pivotally mounted rockable segment which is designated $j^1$ in Fig. 2 of the drawings, this segment being rocked by means of a spring-loaded telescopic plunger rod which is substituted for the connecting rod $k$ in Fig. 1. The lower end of this telescopic rod has a pin connection $k^4$ to the cam $n$ instead of the crank $k^1$ (Fig. 1). This modified practical construction of the invention also illustrates the embodiment of a tipping mercury switch $u$ which is rocked by means of the lever $w$, one end of which is in contact with the periphery of an auxiliary cam $n^1$ mounted on the cam shaft $l$, whereby at predetermined periods in the sequence of each cycle the mercury switch is tipped to make or break a circuit through the motor $m$ and through the signalling device when this is associated with the apparatus. A plurality of switches $u$ may be incorporated to control the different circuits through the signal lamps or other devices.

It will not be necessary having regard to the aforesaid description of the diagrammatic illustration of the invention (Fig. 1) to describe in detail the mechanism illustrated in Figs. 2, 3, and 4 of the drawings as similar reference letters have been used throughout to designate similar parts of the mechanism to facilitate reference and an understanding thereof, but a brief description will now be given of that part of the mechanism which as previously stated differs from or is a modification of the diagrammatic mechanism seen in Fig. 1.

The weighing wheel or outer clutch section $d$ has through a wound spiral spring $c$ connection to the index pointer $a$ the spindle of which may be driven from the weighing mechanism by a conventional rack and pinion drive $a^3$. Mounted on the spindle by means of a flanged collar $a^2$ is the arm $a^1$ which is adapted to be associated with the arm $d^2$ connected to the weighing wheel or outer clutch section $d$, the section $d$ being connected to the arm $d^2$ by means of the sleeve $d^4$. The outer section of the clutch $d$ carries the projection $d^3$ which corresponds to the short arm $d^3$ in Fig. 1. Within this outer section of the clutch $d$ is located the internal expandible inner part of the clutch corresponding to the measuring wheel $q$ which expandible part is rotatably located partially within the sleeve $f$ which corresponds to the spindle $f$ in Fig. 1. Rotatable on the sleeve $f$ is the pinion sleeve $g$ formed integral with the pinion $i$. The expandible section of the clutch comprises the three radially disposed arms $q^1$ which each incorporate a coiled compression spring $o^2$ which serve the function of the spring-loaded arm $o$ (Fig. 1), this section of the clutch is expanded by means of the slidable taper-ended spindle $x$ which is longitudinally moved as a result of the rotation of the cam $n$ permitting a lowering motion of the roller $o^1$ mounted on the lower end of the rod $o$ which is depressed by the leaf spring $y$ which results in a downward motion of one end of a bell-crank lever $z$, the other arm of the bell-crank lever being coupled to the outer end of the spindle $x$. It will be observed that the inner tapered end of the spindle $x$ will thereby move inwardly and contact with and expand the clutch pins $q^1$ against the resistance of the coiled springs $o^2$, the outer ends of the pins $q^1$ being thus maintained in abutment with the inner periphery of the outer section $d$ of the clutch. The measuring clutch member $q$ is rigidly connected by the sleeve $f$ to the sprocket wheel $q^2$ forming part of the transmission to the totalizing counter $r$.

The pivotally mounted toothed segment $j^1$ which pivots about the pin $j^3$ is rocked by means of the telescopic plunger rod generally designated $k$, the upper end of which is pivotally connected at $j^2$ to the carrier arm of the toothed segment $j^1$. This telescopic plunger rod embodies an inner or lower section $k^2$ which is spring-loaded by means of the coiled compression spring $h$ located within the outer tubular part of the plunger $k$, the lower end of the part $k^2$ of this plunger being connected by means of the pivot pin $k^4$ to the cam $n$, so that rotation of the cam will effect a reciprocable motion of the plunger rod $k$ and an arcuate rocking motion of the toothed segment $j^1$ which meshes with the pinion $i$ which forms part of the sleeve $g$.

Referring now to Figs. 2 to 4 in association with Fig. 5 of the drawings, Fig. 5 illustrates a signalling device to be associated with the apparatus which can be illuminated and which also illustrates the incorporation of a printing mechanism for a tape or ticket record. This signalling device is arranged in circuit from the motor $m$ and comes into operation after the commencement of the cycle of operation dependent upon the application of the load to the machine. A mercury tipping switch or switches such as is designated $u$ controls the circuit through the signalling device indicating when the load may be applied to the platform of the apparatus and this switch is automatically brought into operation to close the switch circuit through the rotation of the cam $n^1$ at a period subsequent to the commencement of the weighing operation. This signal is that of the arrow device on the left-hand side of Fig. 5. In addition it will be observed that there are two other signal lamps, one at the centre of the panel indicating that the apparatus is not to be touched, and another on the right-hand side of the panel which indicates when the load may be removed, that is upon the completion of the cycle of operation of the apparatus which is determined by one complete rotation of the cam shaft $l$. There is also incorporated on the panel a transparent disc $t$ which may be illuminated to afford a visual indication of the weight indicator and part of the graduated chart or dial $b$ associated therewith for the purpose of indicating when required a test position of the mechanism whereby at any time a check may be effected and visual indication afforded that the mechanism is in a balanced position. The panel which carries the signalling device may also be utilised as indicated in Fig. 5 to provide a mounting for the weight totalizer or counter $r$ and for a printing mechanism $v$ which latter provides in known manner a means of obtaining a record of the weight and other data on a tape or ticket. Although the totalizer $r$, shown in Figure 1, may be mounted on the signalling panel, it may also be mounted in another position and therefore is not shown in Figure 5. The printing mechanism and the totalizing mechanism are independently geared to the transmission from the operative part of the mechanism.

A full rotation of the index pointer $a$ is approximately through 300° but the arm or projection $g^1$ (Figs. 2 and 3) attached to the pinion $i$ is permitted a driven travel of approximately 330° thus giving an excess movement of 30° to this arm or projection, which additional movement is utilised to provide a safety period to ensure that the weighing pointer $a$ has come to rest. Thus there is provided an arbitrary margin for the connecting or clutching motion between the members $d$ and $q$ avoiding the necessity for the power driven mechanism associated with the measuring or totalizing part of the apparatus and the weighing mechanism to be clutched together and start totalizing at the same moment. The stop $s$ in this embodiment of the invention is adjustable and takes the form of a bell-crank lever pivoted on the pin $s^1$, the one arm of the bell-crank being controlled or adjusted in its initial setting by means of the screw adjustment $s^2$.

I claim:

1. In an automatic weighing apparatus comprising a totalizing mechanism, in combination, a load-responsive member, weighing mechanism for positioning the load-responsive member in accordance with the weight of the load, said weighing mechanism having a lost-motion connection with the load-responsive member, flexible resilient means for normally taking up the lost motion in said connection, a driving member, which normally is out of engagement with the load-responsive member, for moving the load-responsive member in a direction that is the reverse of the direction in which it is moved by application of a load, means for actuating the driving member to move the load-responsive member from a load-responsive position back to its normal no-load position, and a driven member, for operating the totalizing mechanism, which is brought by said actuating means into driven engagement with the load-responsive member prior to engagement of the driving member with the load-responsive member.

2. In an automatic weighing apparatus comprising a totalizing mechanism, in combination, a load-responsive member that is positioned in accordance with the weight of the load, a driving member movable into positive abutment with the load-responsive member in a direction that is the reverse of the direction in which the load-responsive member is moved by application of a load, the normal position of the driving member being beyond the range of movement of the load-responsive member, means for actuating the driving member to move the load-responsive member from a load-responsive position back to its normal no-load position, and a driven member, for operating the totalizing mechanism, which is brought by said actuating means into driven engagement with the load-responsive member during the initial movement of the driving member before it enters the range of movement of the load-responsive member, whereby engagement of the driven member before engagement of the driving member is ensured.

3. A device in accordance with claim 2 comprising a positive stop which is engaged by the driving member as the load-responsive member reaches its no-load position.

4. A device in accordance with claim 2 in which the actuating means, after actuating the driving member to move the load-responsive member back to its no-load position, operates to disengage the driven member and then to return the driving member in the opposite direction to its normal position.

5. A device in accordance with claim 2 which comprises a lost-motion driving connection between the actuating means and the driving member, and flexible resilient means for normally taking up the lost motion in said connection, and in which the actuating means, after actuating the driving member to move the load-responsive member back to its no-load position, operates to disengage the driven member and then to return the driving member in the opposite direction to its normal position.

6. A device according to claim 2 in which the load-responsive member and the driven member form the engageable members of a clutch.

ALFRED ERNEST PAGE.